US006916442B2

(12) United States Patent
Dupont et al.

(10) Patent No.: US 6,916,442 B2
(45) Date of Patent: Jul. 12, 2005

(54) PROCESS AND DEVICE FOR THE EXTRUSION-MOULDING OF HOLLOW BODIES MADE OF A THERMOPLASTIC

(75) Inventors: Serge Dupont, Vilvoorde (BE); Bjorn Criel, Merelbeke (BE); Pascal De Henau, Maleves-Ste-Marie (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 219 days.

(21) Appl. No.: 10/220,041

(22) PCT Filed: Feb. 20, 2001

(86) PCT No.: PCT/EP01/01875

§ 371 (c)(1),
(2), (4) Date: Mar. 10, 2003

(87) PCT Pub. No.: WO01/64422

PCT Pub. Date: Sep. 7, 2001

(65) Prior Publication Data

US 2004/0056391 A1 Mar. 25, 2004

(30) Foreign Application Priority Data

Feb. 29, 2000 (BE) .......................................... 2000/0164

(51) Int. Cl.[7] .......................... B29C 49/04; B29C 49/30
(52) U.S. Cl. ....................... 264/540; 264/542; 425/532; 425/534
(58) Field of Search ................................. 264/540, 542; 425/532, 534

(56) References Cited

U.S. PATENT DOCUMENTS

| 4,747,768 A | | 5/1988 | Crupi |
| 4,777,006 A | | 10/1988 | Wenger et al. |
| 5,264,178 A | | 11/1993 | Yamamura et al. |
| 5,464,635 A | * | 11/1995 | Geiger ........................ 425/532 |
| 5,601,779 A | * | 2/1997 | Ishikawa et al. ............. 264/520 |
| 5,792,490 A | | 8/1998 | Geiger |
| 5,965,082 A | | 10/1999 | Tietto |
| 6,168,750 B1 | | 1/2001 | Van Schaftingen et al. |
| 6,176,699 B1 | * | 1/2001 | Franjo et al. ................ 425/528 |

FOREIGN PATENT DOCUMENTS

EP  0 927 623 A1  7/1999

* cited by examiner

Primary Examiner—Suzanne E. McDowell
(74) Attorney, Agent, or Firm—Stites & Harbison PLLC; Ross F. Hunt, Jr.

(57) ABSTRACT

Process and device for the extrusion-moulding of hollow bodies made of a thermoplastic, comprising the extrusion of a tubular parison, its deposition via the use of a robot arm in a preforming device which takes it into a lower part of a mold in which the parison is blow-molded in order to produce the hollow body. Certain steps of the process may be carried out in parallel. This process and this device are very suitable for producing hollow bodies of complex three-dimensional geometry with a high productivity.

10 Claims, 2 Drawing Sheets

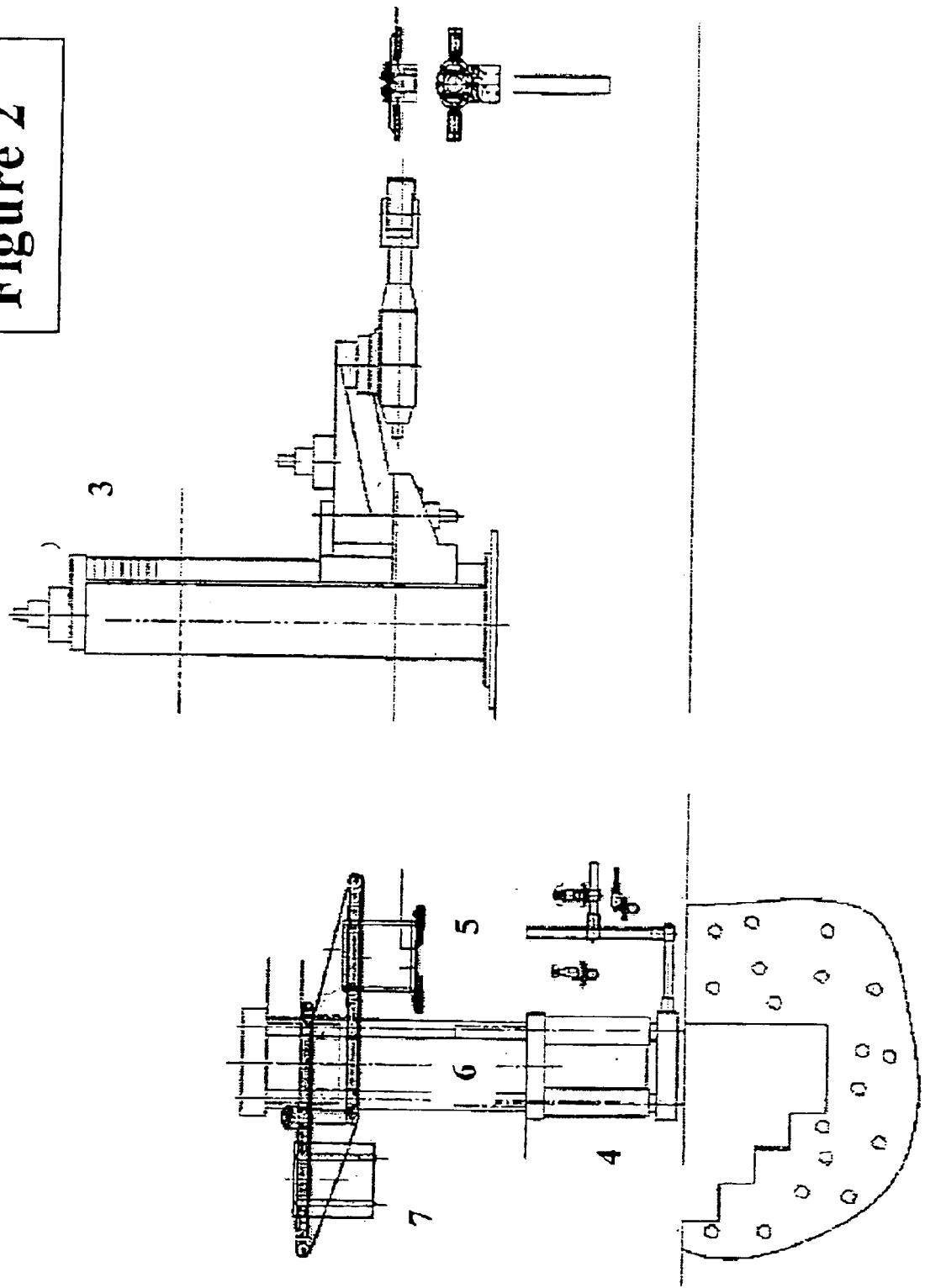

Figure 1:
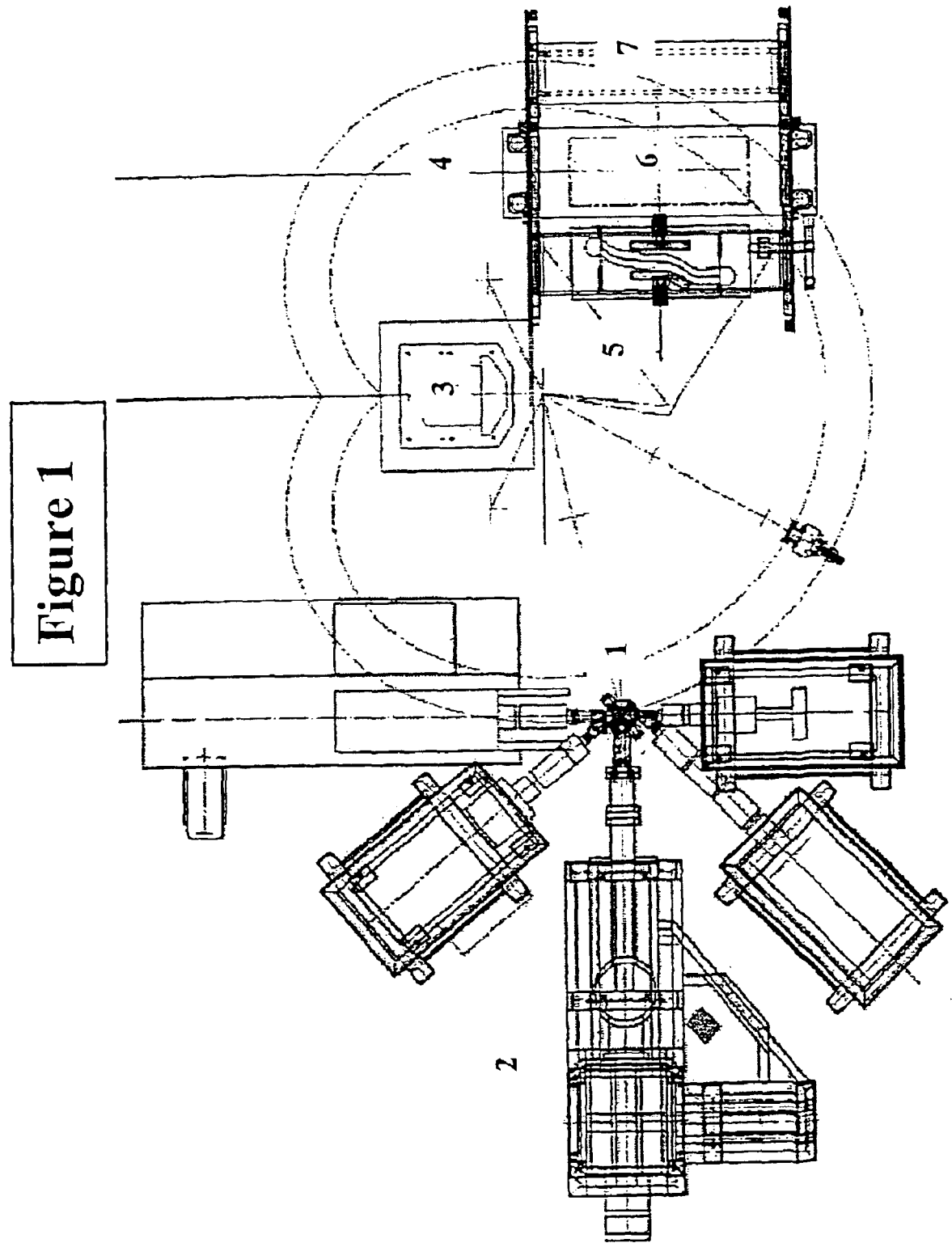

PROCESS AND DEVICE FOR THE EXTRUSION-MOULDING OF HOLLOW BODIES MADE OF A THERMOPLASTIC

The present invention relates to a process for the extusion-moulding of hollow bodies made of a thermoplastic allowing, in particular, the manufacture of moulded hollow bodies of complex three-dimensional geometry.

These hollow bodies have many applications. Among them mention may be made of those in the motor-vehicle field such as, for example, the tubings for filling fuel tanks and for tanks containing various fluids such as the engine coolant, the fluid for the hydraulic brake control system, the screenwash or headlight-wash liquid, and the refrigerant for air-conditioning systems. Another group is also formed by the pipes for ventilation and for transporting various fluids. These filling tubings and these pipes are positioned and have a path which is often determined by the complex and often exiguous shape of the free space left between the components and various systems of which the vehicle or its engine are composed. This results in an increasing need in modern vehicles to be able to fit hollow bodies, which are sometimes of large size, of often very complex three-dimensional geometry.

Various known solutions have been applied to this problem, each providing its particular advantages.

For example, an extrusion blow-moulding process disclosed by Patent Application CA-2 241 595 is known, this consisting in carrying out in sequence the following operations:

extrusion of a parison comprising the thermoplastic through an extrusion head;

gripping of the top part of the parison by a handling robot;

displacement of the parison by means of the robot to a point close to a three-dimensional funnel-shaped model-guide placed above the cavity of a horizontal mould portion;

introduction of the parison into the model-guide by a descending movement of the robot's arm, followed by a movement allowing the parison to be deposited, following the configuration of the model-guide in such a way that the parison assumes the shape of the latter;

passage of the preformed parison from the model-guide to the mould cavity;

closure of the mould;

blow-moulding of the parison inside the mould;

opening of the mould; and demoulding of the article.

However, this known process does not employ a preforming tool capable of impressing a complex three-dimensional shape on the parison.

It also has the disadvantage that deposition of the parison in the model-guide does not take place in parallel with the operation of blow moulding the preceding parison in the mould, which consequently limits the productivity of the overall process for producing articles to quite a low level.

Moreover, since depositing the parison in the model-guide introduces heterogeneous cooling of the parison in the direction of the deposition path because of the decreasing time in which the parison portions are in contact with the model-guide as the parison is being deposited, the subsequent blow moulding in the mould also produces heterogeneities in the dimensions of the article manufactured.

The object of the invention is to remedy these drawbacks while still maintaining the handling flexibility and mould manufacturing cost advantages associated with the use of a handling robot.

For this purpose, the invention relates to a process for the extrusion-moulding of hollow bodies made of a thermoplastic, comprising the cycle of the following steps:

a) a tubular parison is extruded in a vertical direction and it flows downwards under the effect of its own weight;

b) the parison is gripped by a robot;

c) the parison is deposited in a preforming tool by the robot;

d) the preformed parison is transferred to above a lower part of a mould by means of this preforming tool;

e) the parison is deposited from the preforming tool in the lower part of the mould;

f) the mould is closed and the parison is moulded;

g) the mould is opened; and h) the hollow body is removed from the mould.

The term "extrusion-moulding" is understood to denote the technique of forming thermoplastic articles comprising a step of extruding or coextruding a monolayer or multilayer preform and a step of moulding this preform. Advantageously, the moulding is carried out by blow moulding inside a closed mould. In the case of articles in the form of hollow bodies, the preforms are parisons of closed cross section, particularly tubular parisons having a cross section with no salient angles. Most generally, the cross section of these parisons is circular or elliptical.

The term "hollow body" denotes here any structure whose surface has at least one empty or concave part. The term "hollow bodies" also denotes tubes, bottles or tanks defining a closed or non-closed volume. In particular, the process according to the invention is well suited to the production of hollow bodies which adopt the shape of a tube or tubing.

The process according to the invention applies to the production of hollow bodies made of a thermoplastic, that is to say a material comprising at least one polymer made of synthetic resin.

All types of thermoplastic may be suitable. Very suitable plastics belong to the category of thermoplastics.

The term "thermoplastic" denotes any thermoplastic polymer, including thermoplastic elastomers, and blends thereof. The term "polymer" is understood to mean both homopolymers and copolymers (especially binary or ternary copolymers). Non-limiting examples of such copolymers are: random copolymers, alternating copolymers, block copolymers and graft copolymers.

Any type of thermoplastic polymer or copolymer whose melting point is below the decomposition temperature is suitable. Synthetic thermoplastics which have a melting range spread over at least 10° Celsius are particularly suitable. As examples of such materials, there are those which exhibit polydispersity in their molecular weight.

In particular, polyolefins, grafted polyolefins, thermoplastic polyesters, polyketones, polyamides and copolymers thereof may be used.

One polymer often employed is polyethylene. Excellent results have been obtained with high-density polyethylene (HDPE).

A copolymer often used is an ethylene/vinyl alcohol copolymer (EVOH). A blend of polymers or copolymers may also be used, as may a blend of polymeric materials with inorganic, organic and/or natural fillers such as, for example, but not limitingly, carbon, salts and other inorganic derivatives, natural or polymeric fibres. It is also possible to use multilayer structures consisting of stacked layers bonded together, comprising at least one of the polymers or copolymers described above. Such multilayer structures may be obtained with the aid of a coextrusion head or by a technique of completely or partly covering a substrate layer with one or more other layers. An example of a covering technique is the spraying of a thermoplastic onto the substrate layer by a spray gun.

According to the invention, the process comprises a certain number of steps carried out in a cycle, that is to say a particular sequence of successive steps.

The expression "extrusion of a tubular parison" denotes a process of passing, through a die, a composition of at least one molten thermoplastic homogenized in an extruder, the head of which terminates in the die, in order to obtain a parison of closed, in particular circular or elliptical, cross section. When the parison is of multilayer structure, several extruders are used, one per layer present in the multilayer structure.

The extrusion process may be continuous. It may also, as a variant, be an extrusion process with accumulation, in a suitable reservoir placed on the extruder, of the thermoplastic in the melt. This extrusion process with accumulation advantageously allows the extrusion of the parison through the die to be rapidly stopped and restarted and allows very flexible adaptation to extrusion-moulding cycles. The extrusion process with accumulation is particularly suitable for fluid thermoplastic resins which have a tendency to elongate substantially under their own weight during expulsion from the extruder. It is also possible, by this accumulation process, to produce parisons having, over their length, portions composed of different materials. This technique is called sequential coextrusion, as opposed to conventional continuous coextrusion, resulting in concentric multilayer structures.

The process according to the invention is very suitable when it is a question of combining the use of a suitable number of extruders with a number of moulding devices such that the respective production rates of each extrusion unit and each moulding unit are respected and cooperate in a flexible way to increase productivity. It is thus possible to combine the use of several extruders with a single moulding device or, on the contrary, one extruder with several moulding devices, according to requirements. It is also possible to combine several extruders with several moulding devices.

In the process according to the invention, the parison is gripped by a robot. The purpose of this operation is to take away a certain length of tubular parison. This may be accomplished, for example, by a knife which periodically cuts the extruded parison in a plane perpendicular to the direction of its flow and by the cut parison being gripped by the robot's gripper. Another technique is to cut the parison using the vertical movement of the central core of the extrusion head (this central core normally being used to modulate the thickness of the parison during its expulsion) and then to grip the parison, as soon as it has been cut, by means of the robot's gripper. Another possible technique is also, for example, to pinch and detach a given length of the flowing parison by means of the gripper of the robot itself, in the close vicinity of the die.

The parison is gripped by means of one arm of a mechanical handling robot. The robot may be manually controlled by an operator. It may also, for at least some of its movements, be controlled by a command and control machine. The latter may respond, in open loop or in closed loop, to the action of a prerecorded computer program and/or may modify its actions in response to signals which come from sensors detecting various situations arising especially from the extrusion-moulding process or from the extruded parison itself.

The robot may be made of any material compatible with parisons, the temperature of which is intermediate between the room temperature and the melting point of the thermoplastic contained in the parison. A metallic material is preferred. Light metals and metal alloys, such as aluminium and its alloys, are particularly preferred.

According to the invention, the robot transfers the parison and deposits it in a preforming tool. The function of this tool is to modify the geometry of the extruded parison before it enters the mould where it will be moulded.

This tool is an object which can be produced in various embodiments. It is advantageous for it to have, in its parts intended to come into direct contact with the parison, a shape which anticipates the final shape that the hollow body that it is desired to produce must adopt, so as to impress on the parison, still soft because of its temperature close to that which it had right in the extrusion die, the preformed shaped desired. The preforming tool may thus have a surface which is plane or curved in a defined conformation, according to the shape desired for the parison before it is introduced into the mould. This property is particularly advantageous when it is aimed to produce three-dimensionally preformed parisons. It is particularly advantageous for the production of hollow bodies of complex three-dimensional geometry.

An example of such a tool is that of a part in the form of a straight valley or one having several curves in succession, the bottom of which is flat or in the form of a surface set by straight lines perpendicular to the axis of the parison. The walls of the valley may constitute a solid surface, for example a plane surface. They may on the contrary be formed by an association of mutually cooperating elements so as to leave voids in the walls. It is thus possible to find walls in the form of lattices, meshes or even simply an alignment of straight or curved rods spaced apart more or less regularly.

It is advantageous that the bottom of such a tool on which the parison rests be designed in such a way as to be able to be retracted on command, so as to deposit the preformed parison from the tool, under the influence of its own weight.

The preforming tool may be made with any material compatible with the parisons, as already described above in the case of the material for the robot.

In the process according to the invention, the preforming tool is capable of transferring the parison to a point above the lower part of a mould. This is because the tool is provided with displacement means so that it can be positioned above the bottom part of an open mould comprising a cavity having a suitable shape intended to receive the parison.

It is possible, for example, to allow the tool to be inserted into the free space lying between the two parts of a mould in an open position.

The preforming tool may, like the robot, be manually controlled by an operator or be subjected to a control as described above.

The parison is then deposited in the lower part of the mould. This deposition may be accomplished by any suitable means, provided that it preserves the preformed shape impressed on the parison by the preforming tool.

It is possible, for example, to turn the tool upside down above the mould so as to deposit the parison in the latter.

Another means is also to employ a mechanical handling robot to grip the preformed parison and deposit it in the lower part of the mould, without modifying its geometry.

A preferred means consists in using a preforming tool provided with a bottom that can be retracted on command, so as to be able very simply to deposit the parison in the lower part of the mould through the open bottom of the correctly positioned tool. This procedure advantageously allows the tool to be brought close to the cavity of the lower part of the mould and prevents any geometrical distortion of the parison while it is being deposited in the mould.

When the preformed parison is in place in the lower part of the mould, the latter is closed by pressing the lower part of the mould against the upper part. The preformed parison is then moulded, for example by the introduction of a blowing fluid into the parison inside the closed mould. For example, this introduction may be accomplished by introducing at least one hollow needle into the closed mould, which needle firstly pierces the parison at one of its ends and then forces the blowing fluid through the needle under sufficient pressure to press the walls of the parison against the entire surface of the cavity of the mould. The blowing may also advantageously be carried out via two needles, each located at one end of the blow-moulded part. The flow of the blowing fluid between the two orifices therefore makes it possible for the effectiveness of the cooling to be significantly increased. The blowing fluid may be a gas, a liquid or a dispersion of at least one liquid in a gas. As pressurized fluid, compressed air has given good results.

It is also possible to use a pressurized purging fluid containing a reactive gas. Such a reactive gas may be fluorine.

It is also possible to use an inert gas, such as nitrogen. A mixture of various gases may also be used, in particular a mixture containing at least two of the abovementioned gases. Among liquids, it may be advantageous to use water. In particular, a fluid giving excellent results is a dispersion (a spray) of water in compressed air.

It is also possible to carry out an additional surface treatment of the hollow body in the mould. In this case, it is possible to use, for example, a reactive gas such as fluorine.

After moulding, the mould is opened and the hollow body produced is removed.

All of the operations of the process may be commanded, sequenced and/or controlled in open-loop or closed-loop mode, as was already described above in regard to the robot and to the preforming tool. Closed-loop control is preferred.

Advantageously, arrangements are made to carry out, at least in part, steps b and c of the cycle immediately following a given cycle simultaneously with at least one of the steps of this given cycle, so as to carry out, at least in part, work in parallel.

According to this procedure, it is also possible, preferably, to carry out, at least in part, steps b and c of the cycle immediately following a given cycle simultaneously with step f of this given cycle.

It is also possible advantageously to carry out, at least in part, step h of this same given cycle simultaneously with step e of the cycle immediately following this given cycle.

Preferably, the two possibilities of working in parallel described above are combined. The benefit is in this case to substantially increase the overall productivity of the plant for producing hollow bodies.

According to one particular method of implementing the process according to the invention, step h is carried out in a recovery device. According to this particular method of implementation, arrangements may be made, for example, for the hollow body to remain fixed to the upper part of the mould, after the latter had been opened, and for a recovery basket to be positioned under the upper part. This result may be achieved either naturally, according to the preferred way of demoulding the part, or via moveable inserts of frusto-conical shape which are placed in the cavity of the upper part of the mould. These inserts keep the hollow body in the upper cavity while the mould is being opened and cause, when they are retracted, this hollow body to drop into the recovery basket.

The nature of the constituent material of the recovery device is chosen to remain compatible with transporting the hollow bodies at the temperature at which they leave the mould.

Materials similar to those described above in the case of the preforming tool are also very suitable for producing the recovery device.

It is also possible to combine, in this particular embodiment of the device for recovering the hollow body, the use of a device for extracting the hollow body in order to make it drop under gravity into the recovery device. An example of such an extraction device involves the penetration of at least one small ram into the volume of the upper cavity of the mould so as to push the hollow body out of this cavity and, by freeing it, cause it to drop out of the cavity.

Advantageously, the process according to the invention is well suited to the production of thermoplastic tubings intended for transporting fuel. In particular, it is very suitable for the production of tubings for filling fuel tanks. It is most particularly beneficial when the filling tubings have to have a complex three-dimensional shape.

The invention also relates to a device for the extrusion-moulding of hollow bodies, comprising an extruder capable of delivering, in a vertical direction, a tubular parison made of a thermoplastic, flowing downwards under the effect of its own weight, and a two-part mould intended for receiving such a parison and for moulding it, which includes a robot capable of gripping the parison after it leaves the extruder, of transferring it and of depositing it in a preforming tool. When the parison is of multilayer structure, several extruders are used, one per layer present in the multilayer structure.

In the description of this device given here, the terms "extrusion-moulding", "hollow bodies", "tubular parison", "thermoplastic", "mould", "blow moulding", "robot" and "preforming tool" have the same meaning as that given above in the case of the process.

Preferably, the preforming tool is provided with means for transferring the preformed parison into part of the open mould. These transfer means of the preforming tool are the same as those described above in the case of the process.

A preferred embodiment of the device according to the invention includes a robot, a preforming tool and mould parts which can move simultaneously, at least in part.

Advantageously, the preforming tool may also be provided with a temperature conditioning system. This prevents excessive cooling of the parison and any thermal heterogeneity in the latter.

Another useful embodiment of the device according to the invention is to provide it with a device for recovering the hollow body upon opening the mould.

This recovery device is similar to that already described above in the case of the process.

The device according to the invention is very suitable for the production of extruded and moulded hollow bodies for use as tubings for fuel. Similar tubings are, for example, the lines or pipes for transporting fuel in motor vehicles having an internal combustion engine. They may also be fuel-filling tubings mounted on tanks intended to contain these fuels. The device according to the invention is most particularly well suited when the tubings are of complex three-dimensional shape.

EXAMPLE

The example which follows is given to illustrate the invention, without wishing to limit its scope thereby.

In a specific example of the process, the device described in FIG. 1 (top view) and FIG. 2 (side view) is used: a multilayer extrusion head (1) is fed by five extruders (2). After expulsion of a useful length of parison, the latter is gripped in its upper part by the robot (3) which deposits it in the preforming tool (6); after deposition, the preforming tool is introduced, by a horizontal movement, into the moulding machine (4) so as to place the parison in the lower part of the blow-moulding mould (5). At the end of the cycle, the part, held in the upper cavity while the mould is being opened, is extracted via the recovery device (7).

What is claimed is:

1. A process for the extrusion-molding of hollow bodies made of a thermoplastic, comprising the cycle of the following steps:
   a) a tubular parison is extruded in a vertical direction and flows downwardly under the effect of its own weight;
   b) the parison is gripped by a mechanical handling device;
   c) the parison is transferred and deposited in a preforming tool by the device;
   d) the preformed parison is transferred to above a lower part of a mold by means of this preforming tool;
   e) the parison is deposited from the preforming tool in the lower part of the mold;
   f) the mold is closed and the parison is molded;
   g) the mold is opened; and
   h) the hollow body is removed from the mold,
   wherein:
      the preforming tool is separate from the mechanical handling device and comprises a portion that comes into direct contact with the parison, said portion being of a shape corresponding to the final shape of the hollow body molded by the process,
      before the parison is gripped by the mechanical handling device, said parison is taken away over a certain length, and
      the gripping of the parison and the deposition in the preforming tool are performed by means of an arm of the mechanical handling device acting as a robot.

2. Process according to claim 1, wherein steps b and c of a further cycle immediately following a given cycle are carried out, at least in part, simultaneously with at least one of the steps of the given cycle.

3. Process according to claim 2, wherein steps b and c of the cycle immediately following a given cycle are carried out, at least in part, simultaneously with step f of this given cycle.

4. Process according to claim 1, wherein step h of a given cycle is carried out, at least in part, simultaneously with step e of the cycle immediately following this given cycle.

5. Process according to claim 4, wherein a device for extracting the hollow body is actuated in order to make the hollow body drop under gravity into a recovery device.

6. A device for the extrusion molding of hollow bodies, comprising at least one extruder capable of delivering, in a vertical direction, a tubular parison made of a thermoplastic, flowing downwards under the effect of its own weight, a mechanical handling device, a preforming tool and a two-part mold intended for receiving such a parison and for molding it, wherein the handling device is a robot equipped with an arm capable of taking away a certain length of the parison after it leaves the extruder, of gripping it, of transferring it and of depositing it in a preforming tool which is separate from the robot, said preforming tool comprising a portion that comes into direct contact with the parison, and said portion having a shape corresponding to the final shape of the hollow body molded by the device.

7. Device according to claim 6, wherein the preforming tool is provided with means for transferring the preformed parison into part of the open mould.

8. Device according to claim 6 wherein the robot, the preforming tool and the mold part may move simultaneously.

9. Device according to claim 6, wherein the preforming tool is temperature conditioned.

10. Device according to claim 6, wherein the hollow bodies which are extruded and molded are tubings for fuel.

* * * * *